Sept. 25, 1956      K. L. HANSEN      2,764,727

SYNCHRONOUS RECTIFIER AND INVERTER

Filed July 23, 1953      2 Sheets-Sheet 1

INVENTOR.
KLAUS L. HANSEN
BY

Sept. 25, 1956   K. L. HANSEN   2,764,727
SYNCHRONOUS RECTIFIER AND INVERTER
Filed July 23, 1953   2 Sheets—Sheet 2

INVENTOR.
KLAUS L. HANSEN
BY
Arthur R. Woolfolk

United States Patent Office 2,764,727
Patented Sept. 25, 1956

2,764,727

SYNCHRONOUS RECTIFIER AND INVERTER

Klaus L. Hansen, Milwaukee, Wis.

Application July 23, 1953, Serial No. 369,903

8 Claims. (Cl. 321—50)

This invention relates to a synchronous rectifier and inverter and is an improvement over that disclosed in my Patent No. 2,493,403 of January 3, 1950, for Synchronous Rectifier and Inverter.

This invention has substantially the same objects as those set forth in my above noted patent.

However, a further object of this invention is to extend the range in regard to voltage and power and to eliminate the auxiliary commutator and its brushes as shown in my above noted patent. In specific detail, with regard to the immediately above feature, this invention has for its object the provision of a rotary double reactor so as to provide two distinct and separate impedances of automatically controlled value and to mount such impedances on the main shaft of the synchronous rectifier to thereby avoid the necessity of the auxiliary commutator hereinabove referred to.

A primary object of this invention is to provide a construction in which the inductive impedances of the reactor core, even when it is unsaturated, are so arranged that there is a midpoint distribution of the current for each of the two portions of the double reactor so that the magnetomotive forces neutralize each other and do not produce a change of flux. This construction therefore allows free flow of current from one main segment to the other main segment of each rectifying commutator at the successive instants, respectively, at which the secondary of their transformers are directly bridged by the respective portions of the reactor.

A further very important object of this invention is to provide a construction of synchronous rectifier for a polyphase system in which a plurality of supply transformers are employed, one for each phase, and in which at no time is the secondary of any of the supply transformers short circuited, but instead in which the inductances although offering a minimum restraint or opposition to the flow of load current from another section or sections of the rectifier, nevertheless provide maximum opposition to flow of current from the particular secondary across which it is bridged thus avoiding a dead short circuit at any time for any secondary.

As set forth in my above noted patent the last condition or result is obtained by having the zero position, so far as rectification is concerned, shifted in accordance with the load through the medium of a series winding coacting with a shunt winding on the field of the synchronous motor which motor drives the rectifying commutators. The windings therefore coact to produce a resultant flux of the field which is shifted with respect to the direction of rotation of the synchronous motor in accordance with the load to thereby cause the rectifying commutators to arrive at their zero positions at different times when the rectifier is running in an unloaded condition than when the rectifier is running in a loaded condition, the shift as stated being proportional to the load. Therefore, a further object is to provide a synchronous rectifier for alternating currents in which sparking is reduced to a minimum under all conditions extending from no load to heavy loads.

Embodiments of the invention are shown in the accompanying drawings in which.

Before proceeding with the description, it is to be understood that the invention is equally applicable to a rectifier or to an inverter and may be so designed or arranged as to use a three phase, two phase or other polyphase system. For the sake of simplicity in the disclosure and in the description the invention has been shown and will be described as a rectifier for a two phase system.

Figure 1:
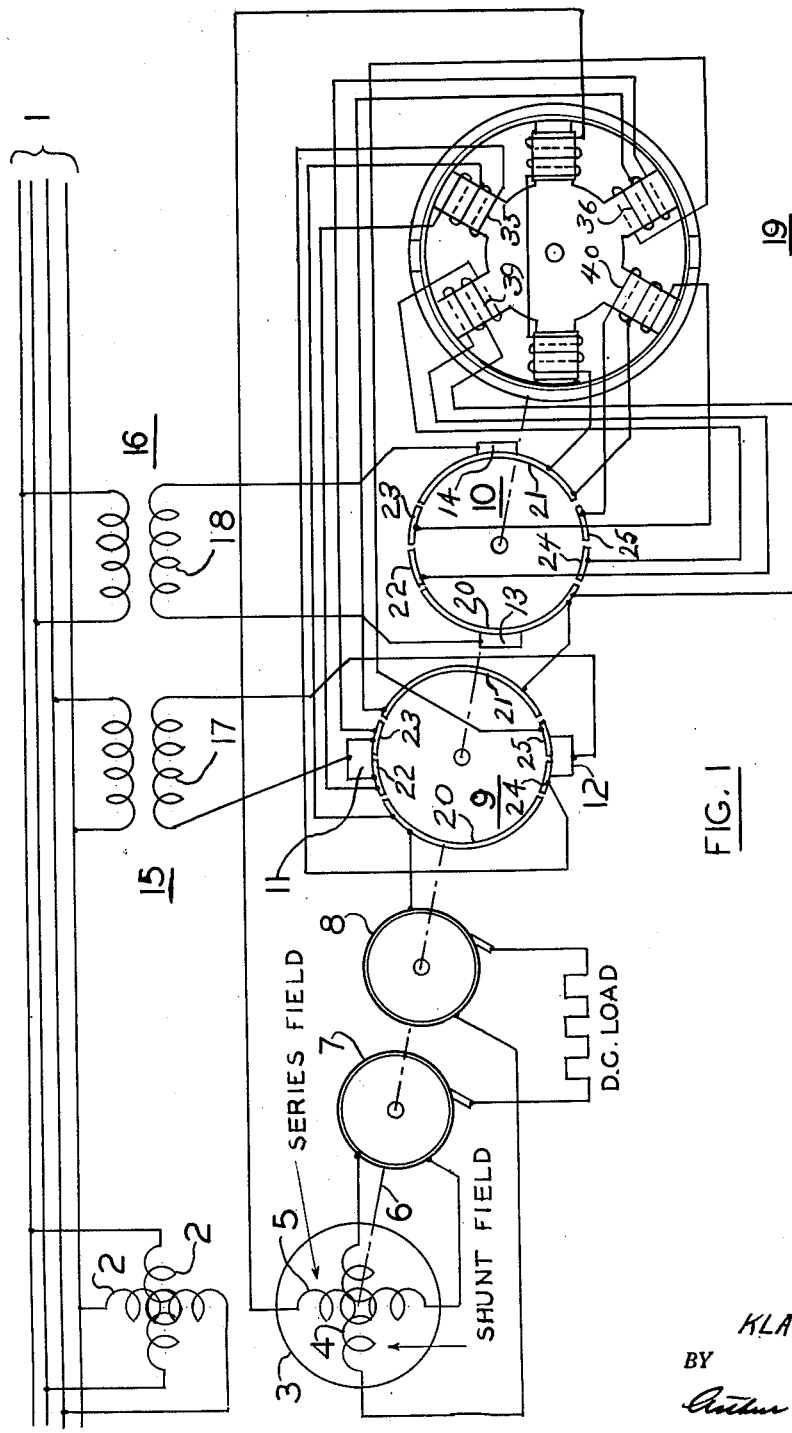
Figure 1 is a diagrammatic view showing the synchronous rectifier and inverter.

Referring to the drawings, particularly Figure 1, it will be seen that a two phase powerline has been indicated by the reference character 1. This powerline supplies the stator windings 2, 2 of the synchronous motor whose rotary field is indicated by the reference character 3. This synchronous motor is provided with a shunt field winding 4 and a series field winding 5. The synchronous motor drives a shaft 6 on which are mounted a pair of slip rings 7 and 8 and a pair of rectifying commutators indicated generally at 9 and 10. The rectifying commutators 9 and 10 are provided, respectively, with pairs of brushes 11, 12 and 13, 14. The brushes are connected to the secondaries of corresponding transformers indicated at 15 and 16 which are provided with primaries connected to the separate phases and with secondaries indicated, respectively, by the reference characters 17 and 18.

The double reactor is indicated generally by the reference character 19.

The rotor 3 of the synchronous motor, the slip rings 7 and 8, the rectifying commutators 9 and 10 and the double reactor 19 are all rigidly mounted on the shaft 6.

The construction of the rectifying commutators 9 and 10 is identical, except that one is set ninety degrees ahead of the other. Each is provided with main segments 20 and 21 and a pair of auxiliary segments indicated at 22, 23 and 24, 25.

Figure 2:
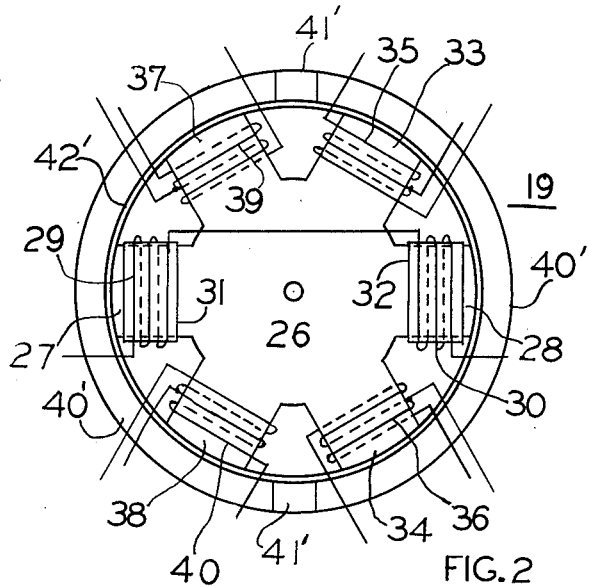
Figure 2 is a view showing the double rotary reactor.

Referring to Figure 2, which shows the double reactor drawn to an enlarged scale, it will be seen that the two portions of the reactor are provided with a common core indicated by the reference character 26. This common core is provided with poles 27 and 28 which carry the direct current windings or load current windings 29 and 30, respectively. Also it is to be noted that the poles 27 and 28 carry conducting sleeves 31 and 32, respectively, which act as damping, or low resistance short circuited windings and tend to prevent any sudden change in the flux through the poles 27 and 28.

The double reactor is also provided with a pair of poles 33 and 34 which carry windings 35 and 36 whose terminals are connected to the auxiliary segments of the rectifying commutator 9. It is to be noted that the terminals of the winding 35 are connected to the auxiliary segments 22 and 24 and that the terminals of the winding 36 are connected to the auxiliary segments 23 and 25 of the rectifying commutator 9.

It is to be noted particularly that the midpoint of the winding 35 is connected to the main segment 20 and the midpoint of the winding 36 is connected to the main segment 21 of the rectifying commutator 9.

Similarly, the double reactor is provided with poles 37 and 38 and windings 39 and 40 whose terminals are connected, respectively, to the auxiliary segments 22, 24 and 23, 25, of the rectifying commutator 10. The midpoint of the winding 39 is connected to the main segment 20 and the midpoint of the winding 40 is connected to the main segment 21 of the rectifying commutator 10.

The reactor also includes a magnetic ring 40', see Figure 2, of laminated material formed in two sections and spaced apart by gaps which may be filled by non-magnetic members 41'. Also, in order that the flux follows closely variations in magnetomotive forces, a small air gap may be introduced between the poles and the laminated ring by means of a thin sheet or shell 42' of non-magnetic material.

Figure 4:
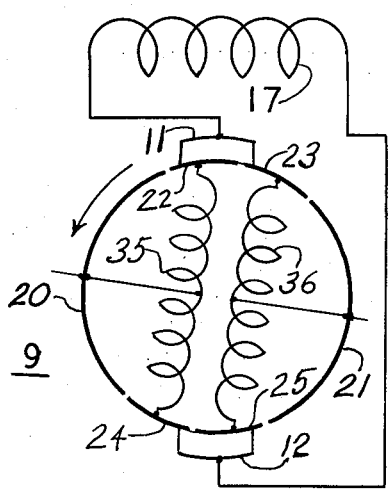
Figure 4 is a view showing one of the rectifying commutators in one position and showing the secondary of one of the transformers.
Figure 5:
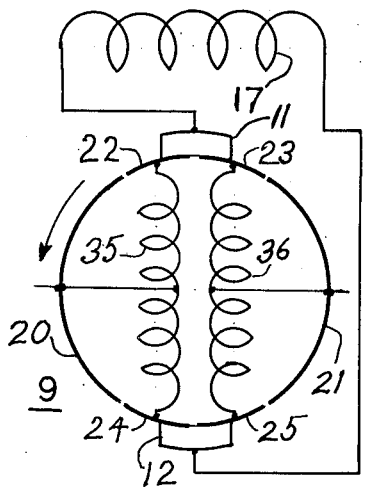
Figures 5 and 6 are views corresponding to Figure 4 showing successive positions of the rectifying commutators shown in Figure 4.

The operation of the apparatus is as follows:

Under no load there is a very small current flowing through the two branches of the reactor in the position shown in Figure 4. When the transformer voltage reaches zero the mechanical position of the parts is as shown in Figure 5, and there the current is at maximum in the reactor. In the position shown in Figure 6 where the current in the two branches of the reactor is decreasing the counter-electromotive force produced by the decreasing current in the reactor is in opposition to the voltage then building up in Figure 5 in the secondary of its transformer.

Figure 6:
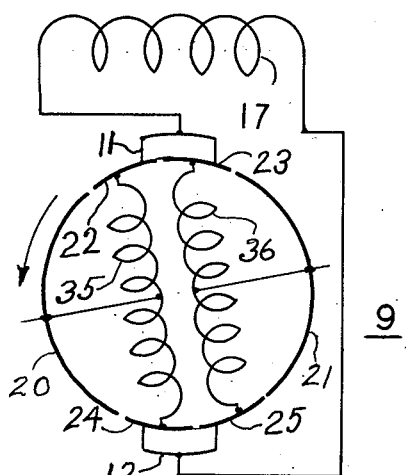

When these two voltages are balanced the current becomes zero and this is the point in which the circuit through the two branches of the rectifier are mechanically broken which point occurs at an instant shortly after that shown in Figure 6.

Under load when the rectifying commutator, under discussion, arrives at a position preceding that shown in Figure 4, it will be seen that the load current will flow through the lower half of the winding 36 as viewed in Figure 4 to the brush 12, through the secondary 17 of the transformer to the brush 11, through the segment 20 of the commutator and to the load line. In the position shown in Figure 4 the brush 11 spans the gap between the auxiliary segments 22 and 23 and the brush 12 spans the gap between the auxiliary segments 24 and 25 thus providing two parallel paths through the winding of the reactor. In this position the voltage in the secondary of the transformer has reversed. This reversal of voltage causes a reduction of current in the secondary of the transformer. It also causes reduction in the two halves of the reactor windings which previously carried the full line current. The reduction of the current in the two halves of the reactor windings is equal to one half the reduction of current in the transformer. In addition to this, current now appears in the upper half of reactor winding 36 and the lower half of reactor winding 35. This current which now makes its appearance in the upper half of winding 36 and the lower half of winding 35 is exactly equal to the reduction of current in the lower half of winding 36 and in the upper half of winding 35. Also, it is to be noted that the core of the reactor is saturated by the load current and consequently very little impedance is offered by the two half sections of the windings 35 and 36 and consequently more and more current flows through these half sections.

The above discussion of the functioning of the apparatus can be explained further as follows. At an instant preceding that shown in Figure 4, assume that the current in the two secondaries 18 and 17 of the transformers is flowing from the right to the left and that the brush 11 is bearing solely upon the commutator segment 20 and the brush 12 is bearing solely on the commutator segment 21 of the commutator 9. The load current will be flowing from the commutator segment 20 of commutator 10 to the commutator segment 21 of commutator 9 through the brush 12 and the secondary 17 of transformer 15 to the segment 20. From the segment 20 the current passes through the load circuit and through the series field 5. From the series field 5 the current passes through the coils 30 and 29, see Figure 2 to the segment 21 of commutator 10 through the secondary 18 of transformer 16 to the segment 20 of commutator 10. This completes the circuit.

At an instant following the above, when the brush 11 bears solely upon the segment 22 of the commutator 9 and the brush 12 bears solely on the segment 25 of the commutator 9, the load current flows from the brush 13 to the segment 20 of the commutator 10 and thence to the segment 21 of the commutator 9. The load current then flows to the mid-point of the coil 35, see Figure 4, through the segment 25 and brush 12 to the right hand side of the secondary 17 of the transformer 15. It then flows through the brush 11 and segment 22 of the commutator 9 through the upper portion of the coil 35. The current then flows from the mid-point of the coil 35 to the segment 20 of the commutator 9, then through the load circuit and series field 5 and then back to the segment 21 of commutator 10.

It will be seen from the above that at no time is the load circuit and series field circuit interrupted.

Further, it is to be noted that the damping windings or conducting sleeves 31 and 32, see Figure 2, tend to lessen the effective impedance of the reactor windings when the current is building up or decaying in the reactor windings.

As the rotation progresses still further to the position shown in Figure 5, it will be seen that the two windings 35 and 36 are in parallel across the brushes.

As rotation progresses beyond the position shown in Figure 6, it will be seen that the sequence of conditions is exactly the reverse of that described immediately hereinabove.

It is to be noted that as the load increases the shift in the resultant magnetic field produced by the combined action of the shunt and series field of the rotor causes commutation to occur at later periods in proportion to the amount of load. At no time is commutation completed until the counter-electromotive force generated by the decaying current in the reactor equals the reversed induced current in the secondaries of the transformers.

At the instant that commutation is completed the decaying current through the reactor generates a counter-electromotive force which exactly balances the reversed voltage induced in the secondary 17 of the transformer and consequently substantially sparkless commutation results.

Figure 7:
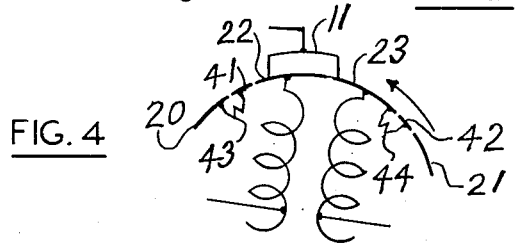
Figure 7 is a fragmentary view of a further form of rectifying commutators.

In the modified form shown in Figure 7 the only difference over that shown in the other figures is that the small resistor 43 or 44 is interposed just before the beginning of commutation and just preceding the finish of commutation. The resistor 43 becomes effective just at the beginning of the commutation and the resistor 44 becomes effective at the closing portion of the commutation period. The resistors 43 and 44 therefore have the effect of accentuating the effect of the change in brush resistance as the brush overlaps less and less of the contacts.

The functioning or purpose of the resistors 43 and 44 can be explained further as follows. When the brush 11 is in contact with the segment 20 and the brush 12 in contact with the segment 21, the current flows directly through the secondary 17 of the transformer 10 and the load. When the rotor has advanced to the position shown in Figure 5, the current can flow from the brush 11 through the two paths in parallel; one through the resistor 43 to the segment 20 and the other through the upper portion of the coil 35 to the segment 20 while the brush 11 is in contact with segments 41 and 22. The object is to have all the current transferred to the reactor by the time the brush leaves segment 41 and interruption of the current is therefore averted. An identical relationship prevails with reference to the lower portion of the coil 36, the brush 12, and the resistor 43.

Obviously, as rotation of the commutator progresses the resistor 44 comes into play in the same manner as resistor 43 providing parallel paths as one resistor 44 is in parallel with the upper half of the coil 36 and the other resistor 44 is in parallel with the lower half of the coil 35.

It is to be noted particularly that at the times when the two components of the load current divide at the central point of the reactor windings and flow in opposite directions therethrough, that the magnetomotive forces balance each other and therefore offer no inductive reactance.

A further important point to be noted is that although no inductive reactance is offered by the reactor to the direct flow of the two divided components of the load current in opposite directions directly therethrough, that nevertheless, the reactor has its end terminals bridged across the secondary of the transformer and whatever reactance the reactor then has, depending on the amount of saturation, is interposed in full between the terminals of the secondary which is at that instant directly connected through the reactor.

Figure 3:
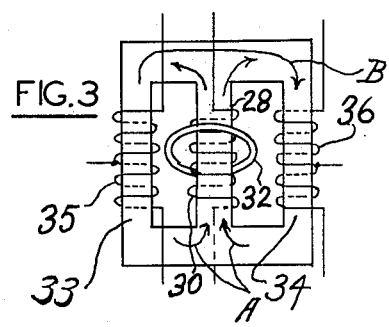
Figure 3 is a schematic view showing one section of the double rotary reactor.

Under load conditions the current flowing through the direct current exciting windings produce a flux whose direction is indicated by the arrows, A, of Figure 3, while the flux produced by current flowing through one half of the winding 35 and the other half of the winding 36, for instance, produce a flux whose direction is indicated by the arrow, B, for the particular instant chosen. Under these conditions one component of the load current will tend to further increase the flux in one of the branches but inasmuch as its core is already saturated it cannot do so to any appreciable extent. On the other hand, it tends to decrease the flux in the other core on the other side of the reactor where the magnetomotive forces are in opposition. However, under load conditions when the load current is suddenly transferred to that section of the winding, for instance, the section of the winding 35, no sudden change in flux can occur since any change in flux in such winding will have to pass through the central core 28 of the reactor and its short circuiting or damping winding 32 will prevent any sudden variation of flux. Therefore, it is apparent that both half sections of the windings 35 and 36, for instance, will offer very little impedance to the free flow of load current therethrough when the brushes are bearing upon the main segments of the rectifying commutator 9.

It will be seen therefore that a novel form of synchronous rectifier and invertor has been disclosed in which a maximum advantage is taken of the peculiar characteristics of the reactor and the associated parts. Further it will be seen that under all conditions from no load to and beyond full load, substantially sparkless commutation results.

This invention has been described as a synchronous rectifier for the sake of simplicity of description, but it is to be understood that the claims are not to limited to a rectifier alone, but are to be interpreted as covering the device whether it is used as a synchronous recitfier or as a synchronous inverter.

Although this invention has been described in considerable detail, it is to be understood that such description is intended as illustrative rather than limiting, as the invention may be variously embodied and is to be interpreted as claimed.

I claim:

1. In a synchronous rectifier, a source of polyphase current, a synchronous motor driven from said source, a plurality of rectifying commutators driven from said motor, pairs of brushes for each of said rectifying commutators connected, respectively, in the several phases of said source to provide a pair of brushes for each phase, a direct current load circuit, means for leading the rectified current from all of said rectifying commutators to said load circuit, reactor means having end terminals and having mid-terminals, and means for connecting the end terminals of said reactor means successively across the several phases of said source during commutation at the respective commutators and for connecting the mid-terminals of said reactor means in said load circuit to provide a path of low impedance for the load current during commutation.

2. In a synchronous rectifier, a source of polyphase current, a synchronous motor driven from said source, a plurality of rectifying commutators driven from said motor, pairs of brushes for each of said rectifying commutators connected, respectively, in the several phases of said source to provide a pair of brushes for each phase, a direct current load circuit, means for leading the rectified current from all of said rectifying commutators to said load circuit, reactor means having end terminals and having mid-terminals, and means for connecting the end terminals of said reactor means successively across the several phases of said source during commutation at the respective commutators and for connecting the mid-terminals of said reactor means in said load circuit to provide a path of low impedance for the load current during commutation, said reactor means having direct current saturating windings for causing saturation of said reactor means in proportion to the load carried by said synchronous rectifier.

3. In a synchronous rectifier, a source of polyphase current, a synchronous motor driven from said source, a plurality of rectifying commutators driven from said motor, pairs of brushes for each of said rectifiying commutators connected, respectively, in the several phases of said source to provide a pair of brushes for each phase, a direct current load circuit, means for leading the rectified current from all of said rectifying commutators to said load circuit, reactor means having end terminals and having mid-terminals, and means for connecting the end terminals of said reactor means successively across the several phases of said source during commutation at the respective commutators and for connecting the mid-terminals of said reactor means in said load circuit to provide a path of low impedance for the load current during commutation, said reactor means having damping windings and having direct current saturating windings for causing saturation of said reactor means in proportion to the load carried by said synchronous rectifier.

4. In a synchronous rectifier, a source of polyphase current, a synchroonus motor driven from said source, said synchronous motor having shunt and series field windings with the series field windings connected in the load circuit, a plurality of rectifying commutators driven from said motor, pairs of brushes for each of said rectifying commutators connected, respectively, in the several phases of said source to provide a pair of brushes for each phase, a direct current load circuit, means for leading the rectified current from all of said rectifying commutators to said load circuit, reactor means having end terminals and having mid-terminals, and means for connecting the end terminals of said reactor means successively across the several phase of said source during commutation at the respective commutators and for connecting the mid-terminals of said reactor means in said load circuit to provide a path of low impedance for the load current during commutation.

5. In a synchronous rectifier, a source of polyphase current, a synchronous motor driven from said source, a plurality of rectifying commutators driven from said motor and having one commutator for each phase, said commutators each having a pair of main segments and diametrically opposed pairs of auxiliary segments located between the main segments, a reactor having pairs of windings whose opposite ends are connected to the auxiliary segments and whose center points are connected to the main segments, said reactor having one pair of windings for each phase, a pair of diametrically opposed brushes for each phase connected to the source of polyphase current and bearing on the respective commutators, a direct current load circuit supplied from said rectifying commutators, and a saturating winding for said reactor connected in said load circuit.

6. In a synchronous rectifier, a source of polyphase current, a synchronous motor driven from said source, a plurality of rectifying commutators driven from said motor and having one commutator for each phase, said commutators each having a pair of main segments and diametrically opposed pairs of auxiliary segments located between the main segments, a reactor having pairs of windings whose opposite ends are connected to the auxiliary segments and whose center points are connected to the main segments, said reactor having one pair of windings for each phase, a pair of diametrically opposed brushes for each phase connected to the source of polyphase current and bearing on the respective commutators, a direct current load circuit supplied from said rectifying commutators, and a saturating winding for said reactor connected in said load circuit, said synchronous rectifier including a single shaft rigidly carrying said rectifying commutators and said reactor.

7. In a synchronous rectifier, a source of polyphase current, a synchronous motor driven from said source, a plurality of rectifying commutators driven from said motor and having one commutator for each phase, said commutators each having a pair of main segments and diametrically opposed pairs of auxiliary segments located between the main segments, a reactor having pairs of windings whose opposite ends are connected to the auxiliary segments and whose center points are connected to the main segments, said reactor having one pair of windings for each phase, a pair of diametrically opposed brushes for each phase connected to the source of polyphase current and bearing on the respective commutators, a direct current load circuit supplied from said rectifying commutators, and a saturating winding for said reactor connected in said load circuit, said rectifying commutators having small segments between the main segments and the auxiliary segments and having resistors connected in regular sequence around each rectifying commutator alternately between a main segment and the following auxiliary segment and between the next adjacent auxiliary segment and a small segment.

8. In a synchronous rectifier, a source of polyphase current, a synchronous motor driven from said source, a plurality of rectifying commutators driven from said motor and having one commutator for each phase, said commutators each having a pair of main segments and diametrically opposed pairs of auxiliary segments located between and immediately adjacent the main segments, a reactor having pairs of windings whose opposite ends are connected to the auxiliary segments and whose center points are connected to the main segments, said reactor having one pair of windings for each phase, a pair of diametrically opposed brushes for each phase connected to the source of polyphase current and bearing on the respective commutators, a direct current load circuit supplied from said rectifying commutators, and a saturating winding for said reactor connected in said load circuit.

References Cited in the file of this patent

UNITED STATES PATENTS

| | | |
|---|---|---|
| 2,351,975 | Koppelmann | June 20, 1944 |
| 2,493,403 | Hansen | Jan. 3, 1950 |

FOREIGN PATENTS

| | | |
|---|---|---|
| 190,666 | Germany | Sept. 13, 1905 |